Patented Apr. 24, 1951

2,550,003

UNITED STATES PATENT OFFICE 2,550,003

COPOLYMERIZATION OF ORGANO-SILOXANES

William Herbert Daudt, Midland, Mich., assignor to Corning Glass Works, Corning, N. Y., a corporation of New York No Drawing. Original application March 30, 1943, Serial No. 481,152. Divided and this application April 15, 1949, Serial No. 87,841

4 Claims. (Cl. 260—448.2)

This invention relates to the acid interaction of organo-siloxanes.

This application is a division of my copending application Serial No. 481,152, filed March 30, 1943, now abandoned and assigned to the assignee of the present invention.

My invention is directed to the inter-action of two or more different organo-siloxanes and to the products derived therefrom. Organo-siloxanes are compounds which contain organic radicals attached to silicon through carbon atoms and whose silicon atoms are linked to other silicon atoms by oxygen atoms, thus Si—O—Si. They may be prepared by the hydrolysis of hydrolyzable organo-silicanes and condensation of the hydrolysis products. Furthermore, hydrolysis of a mixture of different hydrolyzable organo-silicanes and co-condensation of the hydrolysis products produces organo-siloxanes which are within the scope of my invention. In the latter case, a hydrolyzable silicane which contains no organic radicals attached to silicon through a carbon atom, such as silicon tetrachloride or ethyl orthosilicate, may be included along with the hydrolyzable organo-silicanes. By hydrolyzable organo-silicanes I mean derivatives of $SiH_4$ which contain from 2 to 3 readily hydrolyzable radicals such as hydrogen, halogens, amino groups, aroxy, alkoxy and acyloxy radicals, etc., the remaining valences of the silicon atoms being satisfied by organic radicals that are joined to the silicon atoms through carbon atoms, such as alkyl, substituted alkyl, aryl, substituted aryl radicals, etc.

Hydrolysis of the above silicanes or mixtures thereof is generally accompanied by condensation to a greater or less degree depending upon the conditions of hydrolysis and the particular silicanes involved. As a result of the hydrolysis and concurrent condensation, organo-siloxanes are produced which are partially or completely condensed and which have on the average up to and including two organic radicals attached to each silicon atom. The polymers so obtained vary in character, some being oily liquids, others being crystalline solids or gels. They also vary in the ease with which they may be further polymerized since they differ in the number of active functional groups retained as a result of incomplete hydrolysis and condensation. Those which are only partially condensed may be converted to higher polymers and even to solids by heat alone by standing at room temperature by virtue of the completion of condensation. On the other hand, those organo-siloxanes which approach complete condensation are extremely resistant to further polymerization by heat alone. These substantially completely condensed polymers are not limited to those which are of high molecular weight but may be polymers of low molecular weight as well. For example, the condensed hydrolysis products of the di-organo-substituted silicanes are essentially completely condensed even in the low polymeric stages and exist generally in the trimeric form.

Various methods have been recently provided for polymerizing the organo-siloxanes to higher polymeric materials which have been found to have properties that render them extremely useful industrially. However, while it is possible to vary the properties of the higher polymers so obtained by varying the conditions and extent of polymerization, the amount of variation is limited by the kind and number of organic radicals present in a given polymer or copolymer. Accordingly, it is desirable to produce organo-siloxanes from two or more of the above described siloxanes and their higher polymers whereby greater opportunity for obtaining a polymeric composition of certain desired properties would be provided.

In the co-pending application of James Franklin Hyde, Serial Number 432,528 filed February 26, 1942 now Patent 2,486,162 and assigned to the assignee of the present invention, the preparation of organo-siloxanes by the copolymerization of two or more different hydrolyzable organo-silicanes by cohydrolyzing and co-condensing the compounds in the desired proportions is described. An inherent disadvantage of this method is the sensitiveness of the hydrolyazle silicanes to moisture so that they are difficult to handle and to store indefinitely without undergoing change. On the other hand, the condensed hydrolysis products of the silicanes or mixtures thereof and the substances obtained therefrom by further polymerization are not subject to this disadvantage and, hence, are to be preferred as starting materials. However, in order for these condensed hydrolysis products, particularly those which are substantially completely condensed, to participate effectively in any copolymerization it is necessary to rupture linkages present in these compounds in order to bring about extensive interlinking between the polymers. Furthermore, it has been found that some of the condensed hydrolysis products, particularly when polymerized to higher polymers, are incompatible or immiscible so that their copolymerization in such cases is rendered even more difficult.

One of the objects of my invention is to provide a method of inter-acting two or more different organo-siloxanes.

A further object of my invention is to provide a method of inter-acting two or more different organo-siloxanes which are substantially free of active functional groups.

Another object of my invention is to provide a method of inter-acting two or more different organo-siloxanes which are immiscible.

Another object of my invention is to provide a method of inter-acting two or more different organo-silicon compounds selected from the group consisting of the condensed hydrolysis products of hydrolyzable organo-silicanes or mixtures thereof and higher polymers of the condensed hydrolysis products.

Still another object of my invention is to prepare new compositions from two or more different organo-silicon compositions selected from the group consisting of the condensed hydrolysis products of hydrolyzable organo-silicanes or mixtures thereof and higher polymers of the condensed hydrolysis products.

In accordance with my invention, I have provided a method of inter-acting two or more different organo-siloxanes which comprises mixing them, adding an acidic agent and maintaining the agent in intimate contact with the mixture of organo-siloxanes until inter-action is effected. As an acidic agent, I prefer to employ an acid of the so-called strong type such as hydrochloric, sulphuric, phosphoric, nitric, oxalic, etc. It is desirable to use a mutual solvent for the organo-siloxanes and the acidic agent in order to insure thorough dispersion of the acid with respect to the siloxanes particularly if the latter are initially immiscible. A combination of acid and solvent which I have found to be particularly effective is a solution of hydrogen chloride in ether. When the combination is used, the organo-siloxanes are dissolved in ether and the resulting solution is saturated with hydrogen chloride and held at room temperature. However, other solvents and other acids have been successfully employed to effect the copolymerization. In some instances, where aqueous acids were employed in the presence or absence of solvent it was found necessary to heat the mixture in order to speed the inter-action to completion. In using heat, however, it is important that the temperature should not be raised too high so as to cause decomposition of the siloxanes or the product. This minimum decomposition temperature is readidly determined by trial and varies, of course, with the particular organo-siloxanes.

The inter-action of two or more organo-siloxanes in the presence of an acidic agent is believed to take place primarily by reason of the rearrangement of the extremely stable Si—O—Si groups under the influence of the acidic agent. In most instances, the effect of acid is so great that the immiscible siloxanes are rapidly converted into homogeneous liquids which do not separate into two phases upon cessation of the treatment. The liquids so obtained may be polymerized to liquids of higher average molecular weight by certain methods of polymerization such as blowing air through them and further treatment with acid. It is to be understood that by inter-action is meant the interlinking of two different organo-siloxanes to form a homogeneous product and not the subsequent polymerization of the product which may be accomplished in any one of the above mentioned ways.

For a better understanding of my invention, reference should be had to the following examples.

Example 1

Liquid polymers of phenyl ethyl silicone and dimethyl silicone are generally immiscible and are substantially free of reactive functional groups. However, when they are dissolved in ether and the solution is saturated with hydrogen chloride and allowed to stand, a homogeneous liquid is obtained upon concentrating the solution. Excellent flexible resins have been prepared by blowing air at elevated temperatures through copolymers containing different proportions of the above two silicones and prepared by the above procedure. Homogeneous copolymers have also been prepared by heating mixtures of the above two silicones at 200° C. in the presence of small amounts of either concentrated sulphuric acid or 85% phosphoric acid. Concentrated hydrochloric acid has also been found to be effective as a copolymerization catalyst when the two silicones are first dissolved in dioxane or partially dissolved in a large quantity of 95% ethanol.

Example 2

Liquid phenyl methyl silicone which was substantially completely condensed was copolymerized with liquid dimethyl silicone in varying proportions by treating mixtures of the two dissolved in ether with hydrogen chloride. Homogeneous oily liquids were obtained which were converted by blowing with air at elevated temperatures to resinous solids.

Example 3

Liquid polymeric phenyl ethyl silicone and liquid polymeric diethyl silicone were mixed in the equivalent ratio of 1:1 and dissolved in ether. The solution was saturated with hydrogen chloride and allowed to stand at room temperature. A homogeneous copolymer liquid was obtained which was converted by blowing with air at 250° C. to a hard infusible resin.

Example 4

Copolymer liquids were obtained by saturating with hydrogen chloride an ether solution of polymeric phenyl ethyl silicone and polymeric methylsiliconic acid. The copolymer obtained from these compounds in the equivalent ratio of 2:3 respectively was found to act as an excellent glass cement. This copolymer upon being heated to 180° C. was readily converted into a thermoplastic material which, upon further heating, changed to a hard and tough resin which displayed a high degree of flexibility and strong adhesion to glass.

Example 5

Homogenous copolymer liquids were obtained by saturating with hydrogen chloride an ether solution of polymeric phenyl ethyl silicone and solid phenylsiliconic acid.

Example 6

A copolymer was prepared by saturating a mixture of polymeric phenyl ethyl silicone and methyltriethoxysilicane in three volumes of technical ether with hydrogen chloride and allowing the solution to stand overnight. There was sufficient water present in the technical ether to hydrolyze the methyltriethoxysilicane to methylsiliconic acid. A homogeneous liquid was produced upon removal of the ether which was washed with water and dried. Air was then blown through it at 250°–260° C. for 2¼ hours when it attained a high enough viscosity so that it could be applied to glass fibre tape. It set to a soft flexible resin after being heated for 3 hours at 250° C. Continued heating for 19 hours at 250° C. made the resin hard and tough.

Example 7

Polymeric dimethyl silicone having a viscosity of 475 centistokes was copolymerized with methyltriethoxysilicane in the equivalent ratio of 10:1 by treating with hydrogen chloride in technical ether solution. As in Example 6, the silicane was hydrolyzed to methylsiliconic acid by the water in the ether. After being washed, concentrated and dried the product was found to have a viscosity of 26.3 centistokes. This copolymer remained fluid down to −80° C.

Other examples of organo-siloxanes which may be inter-acted by my method are the condensed hydrolysis products of dipropylsilicon dichloride, dibutyldiethoxysilicane, diamylsilicon dichloride, ethyltriethoxysilicane, propylsilicon trichloride, etc. Besides these examples, organo-siloxanes containing on the average of from less than one up to two organic radicals per silicon atom have been interacted in accordance with my invention. These siloxanes were prepared by the cohydrolysis and co-condensation of mixtures of differently substituted hydrolyzable silicanes obtained directly as mixtures from the Grignard reaction of an organo-magnesium halide on silicon tetrachloride or ethyl ortho-silicate or prepared by mixing different silicanes to give mixtures of desired constituents in predetermined quantities. Among the silicanes employed to accomplish the latter were silicon tetrachloride, ethyl orthosilicate, methyltriethoxysilicane, dimethyldiethoxysilicane, phenylmethyldiethoxysilicane, phenyl silicon trichloride, diphenyldiethoxysilicane, ethyltriethoxysilicane, diethyl silicon dichloride, phenyl ethyl silicon dichloride, butyltriethoxysilicane, dibutyldiethoxysilicane, benzyltriethoxysilicane, dibenzyldiethoxysilicane and others. Mixtures containing more than two organo-siloxanes have also been inter-acted by my method.

In view of the above examples it is clear that inter-action of two or more different organo-siloxanes may be accomplished by treating the mixture in accordance with my invention even though one or more of the siloxanes is substantially completely condensed. It is further evident that the method is applicable whether the compounds are miscible or immiscible. Besides the organic radicals disclosed in the above examples other radicals may be attached directly to silicon atoms through carbon atoms such as propyl, isopropyl, isobutyl, hexyl, heptyl to octadecyl and higher; alicyclic radicals such as mono- and poly-alkyl phenyls as tolyl, xylyl, mesityl, mono-, di-, and tri-propyl phenyls, etc.; naphthyl, mono- and poly-alkyl naphthyls as methyl naphthyl, diethyl naphthyl, tri-propyl, naphthyl, etc.; tetra-hydro-naphthyl; anthracyl, etc.; aralkyl such as phenyl-ethyl, etc.; alkenyl such as methallyl, etc. It is to be understood that the above radicals may also contain inorganic substituents such as halogens, etc.

The products prepared in the manner described in the above examples may be used for a variety of purposes. For example, when polymerized further to a heat-convertible state they may be used as coating and impregnating agents, particularly in the fabrication of electrical insulating materials, because in the heat-convertible stage they may be dissolved and applied in the form of solutions for the impregnation of various fibrous materials and thereafter can be further polymerized by heat to complete insolubility and infusibility. In the latter state they have good mechanical characteristics and good electrical properties at room temperature, all of which are retained at temperatures above those at which prior coating materials break down and deteriorate.

In addition to the use of the new products in the field of electrical insulation, there are many others for which these polymers are eminently adapted even without further polymerization. They may be used as hydraulic fluids, liquid insulating media, thermal expansion fluids, waterproofing agents, etc. Their resistance to high temperature, their electrical properties, low freezing points and high boiling points adapt them to many diversified industrial applications.

That which is claimed is:

1. The method of interacting an organo-siloxane whose structural units correspond substantially to the formula $R_2SiO$ with a siloxane whose structural units are selected from the group consisting of mono-organosiliconic acids wherein the organic radical is a monovalent hydrocarbon radical and siloxane units of the formula $R'_2SiO$ where R and R' are monovalent hydrocarbon radicals attached to the silicon through carbon-silicon linkages, the structural units of said siloxane being linked through the oxygen atoms thereof, said organo-siloxanes being soluble in a common solvent and at least one of said organo-siloxanes being completely dehydrated, which method comprises contacting a mixture of said organo-siloxanes in a homogeneous liquid phase with a strong acid under reaction conditions to effect interaction of said siloxanes.

2. The method of interacting an organo-siloxane whose structural units correspond substantially to the formula $R_2SiO$ with a siloxane whose structural units are selected from the group consisting of mono-organosiliconic acids wherein the organic radical is a monovalent hydrocarbon radical and siloxane units of the formula $R'_2SiO$ where R and R' are monovalent hydrocarbon radicals attached to the silicon through carbon-silicon linkages, the structural units of said siloxanes being linked through the oxygen atoms thereof, said siloxanes being immiscible, which method comprises contacting a mixture of the siloxanes with a strong acid under reaction conditions whereby to effect interaction of said siloxanes.

3. The method of interacting an organo-siloxane whose structural units correspond substantially to the formula $R_2SiO$ with a siloxane whose structural units are selected from the group consisting of mono-organosiliconic acids wherein the organic radical is a monovalent hydrocarbon radical and siloxane units of the formula $R'_2SiO$ where R and R' are monovalent hydrocarbon radicals, said radicals being attached to the silicon through carbon-silicon linkages, the structural units of said siloxanes being linked through the oxygen atoms thereof, and said siloxanes being immiscible, which method comprises contacting a mixture of said siloxanes in a mutual solvent with a strong acid under reaction conditions to effect interaction of said siloxanes.

4. The method in accordance with claim 3 wherein the acid is hydrochloric acid.

WILLIAM HERBERT DAUDT.

REFERENCES CITED

The following references are of record in the file of this patent:

UNITED STATES PATENTS

| Number | Name | Date |
|---|---|---|
| 2,465,188 | Barry et al. | Mar. 22, 1949 |
| 2,469,888 | Patnode | May 10, 1949 |
| 2,469,890 | Patnode | May 10, 1949 |